United States Patent [19]

Noshiro et al.

[11] 4,115,329

[45] Sep. 19, 1978

[54] PRINTING INK COMPOSITIONS

[75] Inventors: Atsumi Noshiro, Chiba; Yoshio Inoue, Annaka, both of Japan

[73] Assignees: Dai Nippon Printing Co., Ltd.; Shin-Etsu Chemical Co., Ltd., both of Japan; part interest to each

[21] Appl. No.: 740,056

[22] Filed: Nov. 8, 1976

[30] Foreign Application Priority Data

Nov. 12, 1975 [JP] Japan .............................. 50-135907

[51] Int. Cl.$^2$ .............................................. C08L 93/00
[52] U.S. Cl. ...................................... 260/25; 101/453; 260/3; 260/3.3; 260/7; 260/9; 260/14; 260/19 R; 260/19 N; 260/18 S; 260/826; 528/130
[58] Field of Search ................... 260/25, 29.15 B, 826, 260/3, 3.3, 7, 9, 14, 19 R, 19 N, 18 S, 25, 59 R, 6, 5

[56] References Cited

U.S. PATENT DOCUMENTS

| | | | |
|---|---|---|---|
| 3,945,957 | 3/1976 | Noshiro et al. | 96/33 |
| 3,948,827 | 4/1976 | Noshiro et al. | 260/16 |

*Primary Examiner*—Melvyn I. Marquis
*Attorney, Agent, or Firm*—McGlew and Tuttle

[57] ABSTRACT

Printing ink compositions which are suitable for use in the method of dry-planographic printing on a high-speed web offset press are provided wherein an ink vehicle comprises from 1 to 70% by weight of a silicone-modified phenolic resin prepared by reacting an oil-soluble solid phenolic resin with an amino group-containing organopolysiloxane. Said ink compositions are capable of producing copy sheets without the occurrence of scumming and the piling of ink throughout a long continuous operation by the said printing method.

5 Claims, No Drawings

PRINTING INK COMPOSITIONS

BACKGROUND OF THE INVENTION

1. Field of the Invention

This invention relates to printing ink compositions and, in particular, to printing ink compositions which are suitable for use in dry-planographic printing.

2. Description of the Prior Art

Recently, various methods have been proposed as a result of extensive investigational efforts directed toward the development of dry-planographic printing processes in which no dampening water is employed. For example, the most important method from the standpoint of practice was a method using planographic printing plates prepared by providing films of a nonsticky substance, such as silicone rubber, on the non-image areas, whereby printing with an oil-based printing ink in the absence of the water or dampening solutions is possible (see, for example, U.S. Pat. No. 3,511,178). One of the critical disadvantages in those dry-planographic printing plates has been the occurrence of scumming on the non-image areas when a conventional printing ink was employed.

In order to overcome this disadvantage, an improvement was proposed to enhance the tack of the printing ink by increasing its cohesion, which, however, results only in a very much increased piling of paper powder to a degree such that no practical printing has been possible.

A further improvement was proposed to formulate a printing ink composition suitable for dry-planographic printing, containing from 0.1 to 10% by weight of an organopolysiloxane (see, for example, Japanese Patent Publication No. 50-11287). This organopolysiloxane-containing ink composition, however, experimentally was found to be defective with respect to stability, bringing about the separation of the organopolysiloxane in the ink composition, since this composition was formulated by merely blending the organopolysiloxane with other materials.

The prior art printing ink compositions are not able to contain organopolysiloxane in high amounts, because there is a tendency for much of the organopolysiloxane content to cause increases in the viscosity of the ink composition, insufficient dispersion of pigments in the ink composition and other undesirable effects, as well as separation of the organopolysiloxane in the ink composition. Accordingly, the prior art ink compositions have had to have a low content of organopolysiloxane, and this eventually works to decrease the repellency of the ink composition, resulting in the occurrence of scumming on the printing plates.

The inventors of the present invention have conducted extensive studies on the improvement of the printing ink composition suitable for use in dry-planographic printing. They had held a basic concept that the problem should be a matter of interrelationship between the printing ink compositions and the printing plates. As a result, they have proposed printing ink compositions for dry-planographic printing containing a silicone-modified alkyd resin as disclosed in U.S. Pat. Nos. 3,945,957 and 3,948,827 or a silicone-modified vegetable oil as disclosed, for example, in Japanese Patent Disclosures No. 51-21907, having very good printability in the actual printing and capable of giving excellent printed copies.

These proposed printing ink compositions are, indeed, suitable for dry-planographic printing on a sheet-fed offset printing press. Such compositions exhibit a very good printability with excellent printed products, but the same compositions are defective when employed in a long-run printing on a high-speed web offset printing press, due to decreased ink tack and increased tendency to scumming. Scumming alone may be prevented from taking place during a long-run printing operation on the printing press by using an ink designed to have a higher initial ink tack, but such high tack tends to give rise to insufficient spread and unfavorable piling of the ink on the inking roller.

OBJECT OF THE INVENTION

It is therefore an object of the invention to provide printing ink compositions free of the above-described disadvantages, which are suitable for use in dry-planographic printing on a high-speed web offset printing press in a long, continuous operation to make excellently printed products.

SUMMARY OF THE INVENTION

The printing ink composition in accordance with the present invention comprises an ink vehicle of which from 1 to 70% by weight is a silicone-modified phenolic resin prepared by reacting an oil-soluble solid phenolic resin with an amino group-containing organopolysiloxane having in a molecule at least one organosiloxane unit represented by the general formula

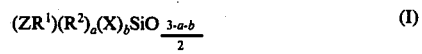
(I)

where Z is a group selected from the class consisting of —NH$_2$, —NHC$_2$H$_4$NH$_2$ and —OR$^3$NH$_2$, R$^3$ being a divalent hydrocarbon group having 2 to 5 carbon atoms, R$^1$ is a divalent hydrocarbon group having 1 to 6 carbon atoms, R$^2$ is a monovalent hydrocarbon group having 1 to 3 carbon atoms, X is a hydroxy group or an alkoxy group having 1 to 6 carbon atoms, $a$ is 0, 1 or 2 and $b$ is 0, 1 or 2 with the proviso that $a + b$ is 0, 1 or 2.

DETAILED DESCRIPTION OF THE PREFERRED EMBODIMENTS

The silicone-modified phenolic resin contained in the ink vehicle in accordance with the present invention is not limitative, insofar as it is a resin prepared by the modification of a phenolic resin as a hard resin with the specific organopolysiloxane as mentioned above. In order to prepare the silicone-modified phenolic resin, as a typical procedure, an oil-soluble solid phenolic resin is mixed with the organopolysiloxane, and the blend is subjected to reaction by heating at a temperature ranging from 100° to 180° C. It is optional to add a certain amount of a petroleum solvent to the blend under reaction for the purpose of regulating the viscosity of the reaction mixture. The reaction of the organopolysiloxane and the phenolic resin presumably proceeds by the mechanism of dehydration condensation or dealcoholation condensation taking place between the hydroxy groups in the phenolic resin and the hydroxy or alkoxy groups in the organopolysiloxane, along with the possible reaction between the hydroxy groups in the phenolic resin and the amino groups in the organopolysiloxane.

The oil-soluble solid phenolic resins may be of a conventional type having a melting point of 60° to 160° C. and a density value of 0.9 to 1.3, and can be prepared by known methods. Phenolic derivatives suitable as the raw material of the resin include phenol, 2-cresol, 4-cresol, 4-ethylphenol, 4-tertbutylphenol, 4-n-butylphenol, 4-tert-amylphenol, 2-phenylphenol, 4-cyclohexylphenol, 4-octylphenol, bisphenol A and 4-benzylphenol.

The organopolysiloxanes, which are suitable for use in the preparation of the silicone-modified phenolic resins by a reaction with the above-mentioned phenolic resins, are required to have, in a molecule, at least one amino-containing organosiloxane unit represented by formula (I) given above. The organosiloxane units other than the amino-containing organosiloxane units, which may be contained in the organopolysiloxane, are those represented by the general formula

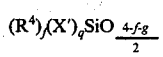

where $R^4$ is a monovalent hydrocarbon group having 1 to 10 carbon atoms or a halogen-substituted group thereof, $X'$ is a hydroxy group or a hydrolyzable group and $f$ and $g$ each are 0, 1, 2 or 3 with the proviso that $f + g$ is a positive integer not exceeding 3. The amino group-containing organopolysiloxanes may be prepared by known methods (see, for example, U.S. Pat. No. 3,576,779). They may have any molecular configuration, say, linear chain, branched chain or ring structure.

With respect to the extent to which the phenolic resin is modified with the organopolysiloxane, it is such that the content of the organopolysiloxane in the modified product is preferably in the range of from 5 to 80% by weight. This is because the organopolysiloxane in an amount less than the range is not capable of giving sufficient effect to decrease the cohesion of the printing ink composition, while it is difficult to have an excessively large amount of the organopolysiloxane reacted with the phenolic resin due to the fact that the reactivity of the organopolysiloxane with the phenolic resin to be modified is limitative.

The printing ink composition of the present invention suitable for use in dry-planographic printing is prepared by homogeneously mixing a conventional ink vehicle to which the above-described silicone modified phenolic resin has been added in an amount of from 1 to 70% by weight based on the vehicle, together with colorants and additives in the presence of solvents or diluents.

The colorants suitable for use in the printing ink composition of the present invention may be any of the conventional organic or inorganic pigments. The additives or auxiliary ink components are waxes, greases, plasticizers, stabilizers, dryers, thickeners, surface active agents, dispersing agents, fillers and the like.

The process of mixing or kneading of the above constituents is performed by use of any conventional means, such as roller mills, ball mills, attriters and sand mills.

The amount of the silicone-modified phenolic resin in the ink vehicle is limited within the range of from 1 to 70% by weight, preferably from 15 to 50% by weight, based on the vehicle. Smaller amounts than the specified range will result in giving an insufficient repellency to the ink on the dry-planographic printing plates, while too much amounts will result in bringing about some problems, such as, instability of the ink on the inking rollors, poor flowability of the ink and decreased affinity between pigment and vehicle in the composition.

The constituents of the ink vehicles other than the silicone-modified phenolic resin in the ink compositions of the present invention may be of any conventional types. Their examples are high-boiling petroleum solvents; natural and synthetic drying oils; natural resins and processed resins thereof, such as rosins, copals, dammars, shellacs, hardened rosins and rosin esters; synthetic resins, such as phenolic resins, phenolic resins modified with rosins, maleic acid resins, alkyd resins, petroleum resins, vinylic resins, polyamide resins, epoxy resins, aminoalkyd resins, polyurethane resins and aminoplast resins; cellulose derivatives, such as nitrocellulose and ethylcellulose; rubber derivatives, such as chlorinated rubbers and cyclic rubbers; and other natural polymeric substances, such as casein, dextrin, and zein. A single material or mixture of materials can be employed. Among the above-mentioned vehicle constituents, the most suitable is a phenolic resin modified with rosin having a softening point in the range of from 120° to 200° C. and an acid value in the range of from 8 to 30 in combination with a high-boiling petroleum solvent having a boiling point of 200° to 400° C.

As described above, the printing ink composition of the present invention is a composition comprising a silicone-modified phenolic resin prepared by modification of an oil-soluble solid phenolic resin with a specific organopolysiloxane, and is suitable for use in dry-planographic printing especially on a high-speed web offset printing press. The present invention has been developed from the prior art in which the printing ink compositions comprising an alkyd resin modified with a silicone or a vegetable oil modified with a silicone are defective and unsuitable for use in high-speed web offset printing because of their thermal instability and relatively large temperature dependency in viscosity as a consequence of the use of the liquid alkyd resins and vegetable oils. Having studied how to overcome such defects encountered in the prior art ink compositions, the inventors of the present invention have discovered that a hard resin which is solid at room temperature or, especially, an oil-soluble solid phenolic resin modified with a specific organopolysiloxane serves to impart thermal stability and smaller temperature dependency in viscosity to ink compositions to render them suitable for use not only in sheet-fed offset printing but also in high-speed web offset printing.

In other words, the very small temperature dependency of the ink tack of the printing ink composition of the invention has been attained by modifying the phenolic resin constituting part of the solid resin in the ink vehicle with the specific organopolysiloxane, thus enabling a stable long-run printing on a high-speed web offset printing press.

In the prior art, there was proposed to decrease the cohesion energy of an ink by adding an organopolysiloxane to the ink by means of mere physical mixing, without forming chemical bonds with vehicles. Such ink compositions have an unsatisfactory dispersion of the organopolysiloxane and less practical, due to several reasons, say, separation and floating of the organopolysiloxane on the surface of the composition, increase in the viscosity of the composition, poor dispersion of pigments in the composition and slipping of the composition of kneading rollers as well as increased use of the organopolysiloxane, instability of the composition on the press and poor printability in a long-run printing.

In contrast thereto, the printing ink compositions of the present invention containing a silicone-modified phenolic resin, in which the phenolic resin and the organopolysiloxane are chemically bonded to each other, and are very stable on the press. The cohesion energy of the vehicle itself in the ink composition is lower than that of the conventional ink compositions and works to give the advantage that no scumming takes place in the dry-planographic printing since the ink is not transferred to the non-image areas on the printing plate where the non-sticky layer is exposed, thus leading to the possibility of stable printing without the unfavorable phenomenon of the floating of the organopolysiloxane on the surface of the ink composition, increase in the viscosity of the composition, poor dispersion of pigments in the composition and slipping of the composition on kneading rollers, and with very good stability on the press and excellent printability in a long-run printing.

In order to understand the invention more fully, the following examples are given, it being understood that the same are merely intended in an illustrative sense, and the invention should not be limited thereby. In the examples, parts are all parts by weight.

EXAMPLE 1

Four ink compositions A, B, B′ and C were prepared, composition A being a sample of this invention and compositions B, B′ and C being samples for comparative purposes. Preparation of each composition was conducted as follows.

A certain amount a vehicle composed of certain resin varnishes and a certain amount of spindle oil, 17.0 parts of carbon black (C.I. Constitution Number 77266), 8.0 parts of phthalocyanine blue (C.I. Constitution Number 74160), 7.0 parts of a wax compound, 1.0 part of cobalt naphthenate, 1.0 part of manganese naphthenate, and 4.0 parts of an anionic surfactant were mixed and kneaded on a three-roller mill. The resin varnishes and their amounts used are given in the following. The amount of the spindle oil was determined such that the Inkometer tack value was 11.0 in each composition as measured under the conditions of 400 r.p.m. and 1 minute at 32° C.

| Composition A: | |
|---|---|
| Rosin-modified phenolic varnish (Formulation I) | 45.0 parts |
| Silicone-modified phenolic varnish (Formulation II) | 20.0 parts |
| Spindle oil | 7.0 parts |
| Composition B: | |
| Rosin-modified phenolic varnish A (Formulation III) | 60.0 parts |
| Spindle oil | 6.0 parts |
| Composition B′: | |
| Rosin-modified phenolic varnish A′ (Formulation IV) | 80.0 parts |
| Spindle oil | 6.0 parts |
| Composition C: | |
| Rosin-modified phenolic varnish B (Formulation V) | 60.0 parts |
| Amino group-containing organopolysiloxane | 1.8 parts |
| Spindle oil | 4.2 parts |

The amino group-containing organopolysiloxane used in the preparation of the silicone-modified phenolic varnish and the rosin-modified phenolic varnish A′ in compositions A and B′, respectively, or in composition C is expressed by the following molecular formula

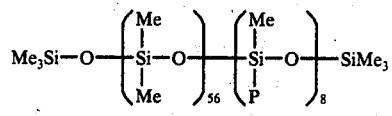

where Me denotes a methyl group and P is a 3-(N-2-aminoethyl)amino-propyl group $-C_3H_6NHC_2H_4NH_2$.

The formulation of each of the above-mentioned vehicle resins was as follows.

ROSIN-MODIFIED PHENOLIC VARNISH (FORMULATION I)

A blend of 40 parts of a rosin-modified alkylphenol resin and 60 parts of spindle oil was heated at 200° C. for 3 hours.

SILICONE-MODIFIED PHENOLIC VARNISH (FORMULATION II)

A blend of 20 parts of a phenolic resin Superbeckasite 1001 (product by Japan Reichhold Chemical Co.), 60 parts of the amino group-containing organopolysiloxane A above and 20 parts of spindle oil was heated at 115° C. for 1 hour to form a clear, yellowish and viscous varnish.

ROSIN-MODIFIED PHENOLIC VARNISH A (FORMULATION III)

A blend of 40 parts of a rosin-modified alkylphenol resin, 10 parts of dehydrated castor oil, 10 parts of the silicone-modified alkyd resin obtained by Formulation IV below, 38 parts of spindle oil and 2 parts aluminum octoate was heated at 180° C. for 6 hours.

ROSIN-MODIFIED PHENOLIC VARNISH A′ (FORMULATION IV)

A blend of 40 parts of a rosin-modified alkylphenol resin, 10 parts of a silicone-modified tung oil obtained by heating a mixture of 70% of tung oil and 30% of the amino group-containing organopolysiloxane A above at 150° C. for 5 hours, 10 parts of dehydrated castor oil, 38 parts of spindle oil and 2 parts of aluminum octoate was heated at 180° C. for 2 hours.

ROSIN-MODIFIED PHENOLIC VARNISH B (FORMULATION V)

A blend of 40 parts of a rosin-modified alkylphenol resin, 10 parts of tung oil, 10 parts of dehydrated castor oil, 38 parts of spindle oil and 2 parts of aluminum octoate was heated at 180° C. for 2 hours.

Each printing ink composition obtained above was subjected to a dry-planographic printing test with the printing plate having a non-sticky layer on the non-image areas, supplied by M.M.M. Co., on a high-speed web offset press operated at a speed of 130 m/second. Composition A proved to be satisfactory for a long run printing over 30,000 revolutions without scumming and piling of ink on the roller and with good spread of ink.

On the contrary, tests with the comparative compositions B and B′ resulted in the occurrence of scumming and piling at approximately 10,000 revolutions, while composition C gave no printed copies of practical value due to drawbacks in ink transfer at approximately 3,000 revolutions. Further it was found that the use of Benzidine Yellow (C.I. Constitution Number 21090), Carmine 6B (C.I. Constitution No. 15850:1), or phthalocyanine blue alone instead of the combination of the carbon black and phthalocyanine blue in composition A gave equally satisfactory results as in composition A.

EXAMPLE 2

A clear, yellowish and viscous silicone-modified phenolic varnish was prepared by heating a mixture composed of 40 parts of a phenolic resin Hitanol 1120 (product by Hitachi Chemical Co.), 40 parts of the same amino group-containing organopolysiloxane as employed in Example 1 and 40 parts of spindle oil at 130° C. for 1½ hours. Separately, a rosin-modified phenolic varnish was prepared by heating a mixture composed of 45 parts of a rosin-modified alkylphenol resin, 10 parts of dehydrated caster oil and 45 parts of spindle oil at 200° C. for 3 hours under agitation.

A printing ink composition was prepared by kneading on a three-roller mill a blend composed of 17.0 parts of carbon black for printing ink, 8.0 parts of phthalocyanine blue, 35.0 parts of the rosin-modified phenolic varnish obtained above, 30.0 parts of the silicone-modified phenolic varnish obtained also above, 7.0 parts of a wax compound, 1.0 part of cobalt naphthenate, 1.0 part of manganese naphthenate and 11.0 parts of spindle oil.

The Inkometer tack value of the thus prepared printing ink composition was 10.5 as measured under the conditions of 400 r.p.m. and 1 minute at 32° C. A printing test was carried out with this ink composition to give the result that this ink composition was as satisfactory as composition A in Example 1.

EXAMPLE 3

A clear, yellowish and viscous silicone-modified phenolic resin varnish was prepared by heating a mixture composed of 20 parts of a phenolic resin PP-3120 (product by Gun-Ei Chemical Co.), 50 parts of the same amino group-containing organopolysiloxane as employed in Example 1 and 20 parts of spindle oil at 130° C. for 3 hours. Separately, a rosin-modified phenolic resin varnish was prepared by heating a mixture composed of 45 parts of a rosin-modified alkylphenol resin, 5 parts of tung oil, 5 parts of an alkyd resin and 45 parts of spindle oil at 120° C. for 3 hours under agitation.

A printing ink composition was prepared by keading in a three-roller mill a blend composed of 17.0 parts of carbon black for printing ink, 8.0 parts of phthalocyanine blue, 40.0 parts of the rosin-modified phenolic varnish obtained above, 25.0 parts of the silicone-modified phenolic resin varnish obtained above, 7.0 parts of a wax compound, 1.0 part of cobalt naphthenate, 1.0 part of manganese naphthenate, 7.0 parts of spindle oil and 4.0 parts of Duomine TDO (product by Lion-Armour Co.).

The Inkometer tack value of the thus prepared printing ink composition was 10.5 as measured under the conditions of 400 r.p.m. and 1 minute at 32° C. A printing test was carried out with this ink composition to give the result that this ink composition was as satisfactory as composition A in Example 1.

EXAMPLE 4

A clear, yellowish and viscous silicone-modified phenolic resin varnish was prepared by heating a mixture composed of 50 parts of a phenolic resin Superbeckasite 3011 (product by Japan Reichhold Chemical Co.), 10 parts of an amino group-containing organopolysiloxane expressed by the molecular formula

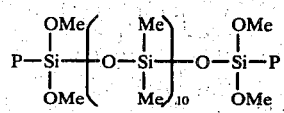

where Me and P were as defined before and 50 parts of spindle oil at 130° C. for 3 hours. From this silicone-modified phenolic resin varnish a printing ink composition was prepared with the same formulation as in composition A of Example 1, and subjected to the same printing test as in Example 1. The result of the printing test was similarly satisfactory.

EXAMPLE 5

A clear, yellowish and viscous silicone-modified phenolic resin varnish was prepared by heating 50 parts of the same phenolic resin as in Example 4, 50 parts of an amino group-containing organopolysiloxane expressed by the molecular formula

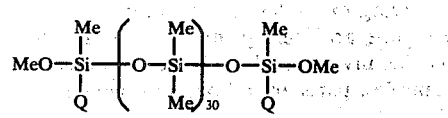

where Me was as defined before and Q was a group expressed by the formula $-C_3H_6NH_2$, and 50 parts of spindle oil at 130° C. for 3 hours. From this silicone-modified phenolic resin varnish a printing ink composition was prepared with the same formulation as in composition A of Example 1, and subjected to the same printing test as in Example 1. The result of the printing test was similarly satisfactory.

EXAMPLE 6

A clear, yellowish and viscous silicone-modified phenolic resin varnish was prepared by heating a mixture composed of 50 parts of the same phenolic resin as in Example 4, 50 parts of an amino group-containing organopolysiloxane expressed by the molecular formula

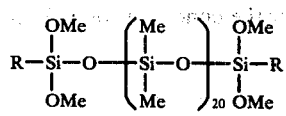

where Me was as defined before and R is a group expressed by the formula $-C_3H_6OC_3H_6NH_2$, and 50 parts of spindle oil at 130° C. for 3 hours. From this silicone-modified phenolic resin varnish a printing ink composition was prepared with the same formulation as in composition A of Example 1, and subjected to the same printing test as in Example 1. The result of the printing test was similarly satisfactory.

What is claimed is:

1. A printing ink composition comprising an ink vehicle of which from about 1 to 70% by weight is a silicone-modified phenolic resin prepared by reacting an oil-soluble solid phenolic resin with an amino group-containing organopolysiloxane having in a molecule, at least one organosiloxane unit represented by the general formula

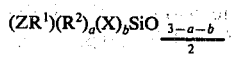

where Z is a group selected from the class consisting of —$NH_2$, —$HC_2H_4NH_2$ and —$OR^3NH_2$, $R^3$ being a divalent hydrocarbon group having 2 to 5 carbon atoms, $R^1$ is a divalent hydrocarbon group having 1 to 6 carbon atoms, $R^2$ is a monovalent hydrocarbon group having 1 to 3 carbon atoms, X is a hydroxy group or an alkoxy group having 1 to 6 carbon atoms, $a$ is 0, 1 or 2 and $b$ is 0, 1 or 2 with the proviso that $a+b$ is 0, 1 or 2, and at least one component selected from the group consisting of high-boiling petroleum solvents, synthetic drying oils, resins, copals, dammars, shellacs, bardened rosins, rosin esters, phenolic resins, phenolic resins modified with rosins, maleic acid resins, alkyd resins, petroleum resins, vinylic resins, polyamid resins, epoxy resins, aminoalkyd resins, polyurethane resins, aminoplast resins, nitrocellulose, ethylcellulose, chlorinated rubbers, cyclic rubbers, casein, dextrin and zein is present in said ink vehicle in addition to said silicone-modified phenolic resin.

2. The printing ink composition as claimed in claim 1, wherein said oil-soluble solid phenolic resin has a melting point in the range of from 60° to 160° C. and a density in the range of from 0.9 to 1.3 g/cm³.

3. The printing ink composition as claimed in claim 1, wherein at least one organosiloxane unit represented by the general formula $$(R^4)_f(X')_g SiO_{\frac{4-f-g}{2}}$$

where $R^4$ is a monovalent hyrocarbon group having 1 to 10 carbon atoms or a halogen-substituted group thereof, X' is a hydroxy group or a hydrolyzable group and $f$ an $g$ each are, 0, 1, 2 or 3 with the proviso that $f+g$ is a positive integer not exceeding 3 is present in said amino group-containing organopolysiloxane besides said organosiloxane unit.

4. The printing ink composition as claimed in claim 1, wherein from 95 to 20% by weight of said oil-soluble solid phenolic resin is reacted with from 5 to 80% by weight of said amino group-containing organopolysiloxane.

5. The printing ink composition as claimed in claim 1, wherein a phenolic resin modified with rosin and a high-boiling petroleum solvent are present in said ink vehicle in addition to said silicne-modified phenolic resin.

* * * * *